(«12») United States Patent
Yuan et al.

(10) Patent No.: US 11,325,477 B2
(45) Date of Patent: May 10, 2022

(54) ELECTRIC-BRAKE ENERGY FEEDBACK SYSTEM

(71) Applicant: ZHUZHOU CRRC TIMES ELECTRIC CO., LTD, Hunan (CN)

(72) Inventors: Wenye Yuan, Zhuzhou (CN); Xinjian Chen, Zhuzhou (CN); Chaolu Chen, Zhuzhou (CN); Lujun Zhang, Zhuzhou (CN); Yong Liu, Zhuzhou (CN); Lingjun Hu, Zhuzhou (CN)

(73) Assignee: ZHUZHOU CRRC TIMES ELECTRIC CO., LTD, Hunan (CN)

( * ) Notice: Subject to any disclaimer, the term of this patent is extended or adjusted under 35 U.S.C. 154(b) by 153 days.

(21) Appl. No.: 16/764,974

(22) PCT Filed: Nov. 8, 2018

(86) PCT No.: PCT/CN2018/114554
§ 371 (c)(1),
(2) Date: May 18, 2020

(87) PCT Pub. No.: WO2019/100945
PCT Pub. Date: May 31, 2019

(65) Prior Publication Data
US 2020/0398676 A1    Dec. 24, 2020

(30) Foreign Application Priority Data
Nov. 23, 2017    (CN) .......................... 201711184169.7

(51) Int. Cl.
*B60L 7/14*    (2006.01)
*H02P 3/18*    (2006.01)
(Continued)

(52) U.S. Cl.
CPC ................... *B60L 7/14* (2013.01); *B60L 1/00* (2013.01); *B60L 7/16* (2013.01); *B60L 7/22* (2013.01);
(Continued)

(58) Field of Classification Search
USPC ......................................................... 318/376
See application file for complete search history.

(56) References Cited

U.S. PATENT DOCUMENTS

2009/0224704 A1*    9/2009  Ibori .................... H02P 3/14
                                                                318/376

FOREIGN PATENT DOCUMENTS

CN    201901014 U  *  7/2011
CN    202080279 U     12/2011
(Continued)

OTHER PUBLICATIONS

International Search Report PCT/ISA/210 for International Application No. PCT/CN2018/114554 dated Jan. 29, 2019.
(Continued)

*Primary Examiner* — Jorge L Carrasquillo
(74) *Attorney, Agent, or Firm* — Harness, Dickey & Pierce, P.L.C.

(57)    ABSTRACT

An electrical brake energy feedback system, including a rectifier and inverter circuit, an intermediate DC circuit, a first voltage detection circuit configured to detect voltages of positive and negative terminals of the intermediate DC circuit to obtain a first voltage signal, a bidirectional DC/DC conversion circuit and/or a regeneration control circuit, and an electrical energy flow control circuit for controlling operating states of the bidirectional DC/DC conversion circuit and/or the regeneration control circuit according to the first voltage signal. With this system, the electrical brake energy can be recovered to the greatest extent when the
(Continued)

vehicle is running in different zones, and the electrical brake energy consumed by the brake resistor is as little as possible. Accordingly, the vehicle and the entire transportation system can be more energy-saving and environmentally friendly.

14 Claims, 2 Drawing Sheets

(51) Int. Cl.
    *H02P 27/06*     (2006.01)
    *B60L 1/00*     (2006.01)
    *B60L 53/20*     (2019.01)
    *B60L 55/00*     (2019.01)
    *B60L 7/22*     (2006.01)
    *B60L 7/16*     (2006.01)
    *B60L 50/60*     (2019.01)

(52) U.S. Cl.
    CPC ............... *B60L 53/20* (2019.02); *B60L 55/00* (2019.02); *H02P 3/18* (2013.01); *H02P 27/06* (2013.01); *B60L 50/60* (2019.02); *B60L 2210/12* (2013.01); *B60L 2210/42* (2013.01)

(56) References Cited

FOREIGN PATENT DOCUMENTS

| | | | |
|---|---|---|---|
| CN | 102983634 A | * | 3/2013 |
| CN | 103153683 A | | 6/2013 |
| CN | 104691343 A | | 6/2015 |
| CN | 106042957 A | | 10/2016 |
| CN | 106347140 A | | 1/2017 |
| CN | 106428035 A | | 2/2017 |
| CN | 206317824 U | | 7/2017 |
| CN | 107031412 A | | 8/2017 |
| EP | 2578435 A1 | | 4/2013 |
| JP | 20100093892 A | | 4/2010 |
| JP | 2013109860 A | * | 6/2013 |

OTHER PUBLICATIONS

Chinese Search Report for Chinese Application No. 2017111841697 dated Nov. 23, 2017.

* cited by examiner

ELECTRIC-BRAKE ENERGY FEEDBACK SYSTEM

CROSS-REFERENCE TO RELATED APPLICATIONS

This application is a national phase under 35 U.S.C. § 371 of PCT International Application No. PCT/CN2018/114554 which has an International filing date of Nov. 8, 2018, which claims priority to Chinese Application No. 201711184169.7, filed Nov. 23, 2017, the entire contents of each of which are hereby incorporated by reference.

TECHNICAL FIELD

The invention belongs to the technical field of urban rail transport, and specifically relates to an electrical brake energy feedback system.

TECHNICAL BACKGROUND

Low-floor tram is a new type of transportation equipment in modern cities, and the running lines for the low-floor tram can be established directly on existing roads in cities. The low-floor tram has the advantages of environmental friendliness, low noise, or the like, and thus becomes one of the most advanced urban transportation systems in the world.

Some new urban rail transit systems, represented by the low-floor tram, usually use sectional power supply (that is, co-existence of networked and non-networked power supply), in order not to affect the urban landscape too much. Therefore, optimal use of energy becomes especially important when the tram is running in zones with and without networked power supply.

SUMMARY OF THE INVENTION

In order to solve the above problems, the present invention provides an electrical brake energy feedback system, comprising: a rectifier and inverter circuit, which is connected with a traction motor, and configured to, under a traction condition, invert DC power received into corresponding AC power to drive the traction motor to run, and, under a braking condition, rectify AC power generated by the traction motor into corresponding DC power; an intermediate DC circuit, which is connected to the rectifier and inverter circuit, and also connected to an auxiliary power supply system in order to transmit electrical energy thereto; a first voltage detection circuit, which is connected to the intermediate DC circuit, and configured to detect voltages of positive and negative terminals of the intermediate DC circuit to obtain a first voltage signal; a bidirectional DC/DC conversion circuit and/or a regeneration control circuit, wherein the bidirectional DC/DC conversion circuit is connected to the intermediate DC circuit, and configured to, according to an actual operating condition, transmit electrical energy from the intermediate DC circuit, after performing voltage conversion, to the energy storage system connected thereto, or transmit electrical energy from the energy storage system, after performing voltage conversion, to the intermediate DC circuit, and the regeneration control circuit is connected to the intermediate DC circuit and an overhead contact net DC port, and configured to turn on or cut off a conductive loop between the intermediate DC circuit and the overhead contact net DC port; and an electrical energy flow control circuit, which is connected to the first voltage detection circuit and the bidirectional DC/DC conversion circuit and/or the regeneration control circuit, for controlling operating states of the bidirectional DC/DC conversion circuit and/or the regeneration control circuit according to the first voltage signal.

According to an embodiment of the present invention, the electrical energy flow control circuit is configured to, when a vehicle is in the braking condition, determine whether the first voltage signal is less than or equal to a first preset voltage threshold, and if yes, control the bidirectional DC/DC conversion circuit and/or the regeneration control circuit to be in a non-operating state, so that the intermediate DC circuit transmits all of electrical energy received to the auxiliary power supply system.

According to an embodiment of the present invention, when the vehicle is in the braking condition, if the first voltage signal is greater than the first preset voltage threshold but less than or equal to a second preset voltage threshold, the electrical energy flow control circuit is configured to control the bidirectional DC/DC conversion circuit to transmit the electrical energy that is provided by the intermediate DC circuit but cannot be consumed by the auxiliary power supply system, after performing voltage conversion, to the energy storage system, in order to charge the energy storage system.

According to an embodiment of the present invention, when the vehicle is in the braking condition, if the first voltage signal is greater than the first preset voltage threshold but less than or equal to a second preset voltage threshold, the electrical energy flow control circuit is configured to control the regeneration control circuit to transmit the electrical energy that that is provided by the intermediate DC circuit but cannot be consumed by the auxiliary power supply system to the overhead contact net DC port.

According to an embodiment of the present invention, the system further comprises: a third voltage detection circuit, which is connected to the bidirectional DC/DC conversion circuit and the electrical energy flow control circuit, and configured to detect a voltage between ports of the bidirectional DC/DC conversion circuit adjacent to the energy storage system to obtain a third voltage signal, and transmit the third voltage signal to the electrical energy flow control circuit; and the electrical energy flow control circuit is configured to determine a charge state of the energy storage system according to the third voltage signal.

According to an embodiment of the present invention, the system further comprises: a second voltage detection circuit, which is connected to the regeneration control circuit and the electrical energy flow control circuit, and configured to detect voltages of positive and negative terminals of the overhead contact net DC port to obtain a second voltage signal, and transmit the second voltage signal to the electrical energy flow control circuit.

According to an embodiment of the present invention, the electrical energy flow control circuit is configured to determine whether the second voltage signal is greater than zero, and if so, then further determine whether the first voltage signal is greater than the second preset voltage threshold, and if so, the electrical energy flow control circuit is further configured to control the regeneration control circuit to turn on the conductive loop between the intermediate DC circuit and the overhead contact net DC port, so that the regeneration control circuit can transmit the electrical energy that is provided by the intermediate DC circuit but cannot be consumed by the auxiliary power supply system and the energy storage system to the overhead contact net DC port.

According to an embodiment of the present invention, the system further comprises: a brake chopper circuit, which is connected to the electrical energy flow control circuit, and configured to, under the control of the electrical energy flow control circuit, turn on or cut off a conductive loop between the intermediate DC circuit and a brake resistor.

According to an embodiment of the present invention, if the second voltage signal is not greater than zero but the first voltage signal is greater than the second preset voltage threshold, the electrical energy flow control circuit is configured to control the brake chopper circuit to turn on the conductive loop between the intermediate DC circuit and the brake resistor, so that the brake resistor can consume the electrical energy that is provided by the intermediate DC circuit but cannot be consumed by the auxiliary power supply system and the energy storage system.

According to an embodiment of the present invention, if the second voltage signal is greater than zero, the electrical energy flow control circuit is configured to determine whether the first voltage signal is greater than the second preset voltage but less than or equal to a third preset voltage threshold, and if yes, it is further configured to control the regeneration control circuit to turn on the conductive loop between the intermediate DC circuit and the overhead contact net DC port, so that the regeneration control circuit can transmit the electrical energy that is provided by the intermediate DC circuit but cannot be consumed by the auxiliary power supply system and the energy storage system to the overhead contact net DC port.

According to an embodiment of the present invention, if the second voltage signal is greater than zero and the first voltage signal is greater than the third preset voltage threshold, the electrical energy flow control circuit is configured to control the regeneration control circuit to turn on the conductive loop between the intermediate DC circuit and the overhead contact net DC port, and control the brake chopper circuit to turn on the conductive loop between the intermediate DC circuit and the brake resistor, so that the brake resistor can consume the electrical energy that is provided by the intermediate DC circuit but neither be consumed by the auxiliary power supply system and the energy storage system and nor be absorbed by the overhead contact net.

The electrical braking energy feedback system according to the present invention can control the flow of the electrical energy generated by the traction motor in different ways based on the zone where the vehicle is located, so that the electrical brake energy can be recovered to the greatest extent when the vehicle is running in different zones, and the electrical brake energy consumed by the brake resistor is as little as possible. Accordingly, the vehicle and the entire transportation system can be more energy-saving and environmentally friendly.

Other features and advantages of the present invention will be explained below, and part of them will become self-evident from the description, or be understood by implementing the technical solutions of the present invention. The objects and other advantages of the present invention can be achieved and obtained through the structures and/or processes indicated in the description, the claims, and the drawings.

BRIEF DESCRIPTION OF THE DRAWINGS

In the following the drawings which are necessary for illustrating embodiments of the present invention or the prior arts will be described briefly, in order to enable the technical solutions of the embodiments of the present invention or the prior arts clear, in which.

DETAILED DESCRIPTION OF EMBODIMENTS

In the following the embodiments of the present invention will be described in detail with reference to the accompanying drawings and examples, so that the procedure concerning how the present invention solves technical problems with technical means to achieve corresponding technical effects can be understood and implemented. The embodiments of the present application and various features in the embodiments can be combined with each other if there are no conflicts therebetween, and the technical solutions formed by such combinations all fall within the scope of protection of the present invention.

Meanwhile, for the purpose of explanation, in the following many specific details are set forth to provide a thorough understanding of the embodiments of the present invention. However, it is obvious to those skilled in the art that the present invention may be implemented without the specific details or manners described herein.

In an embodiment of the present invention, a new electrical brake energy feedback system is provided, in order that the electrical brake energy can be consumed as little as possible by the brake resistor but recovered to the greatest extent when the low-floor tram of energy storage type is running in the zones with sectional power supply, so that the entire transportation system is more energy-saving and environmentally friendly.

Figure 1:
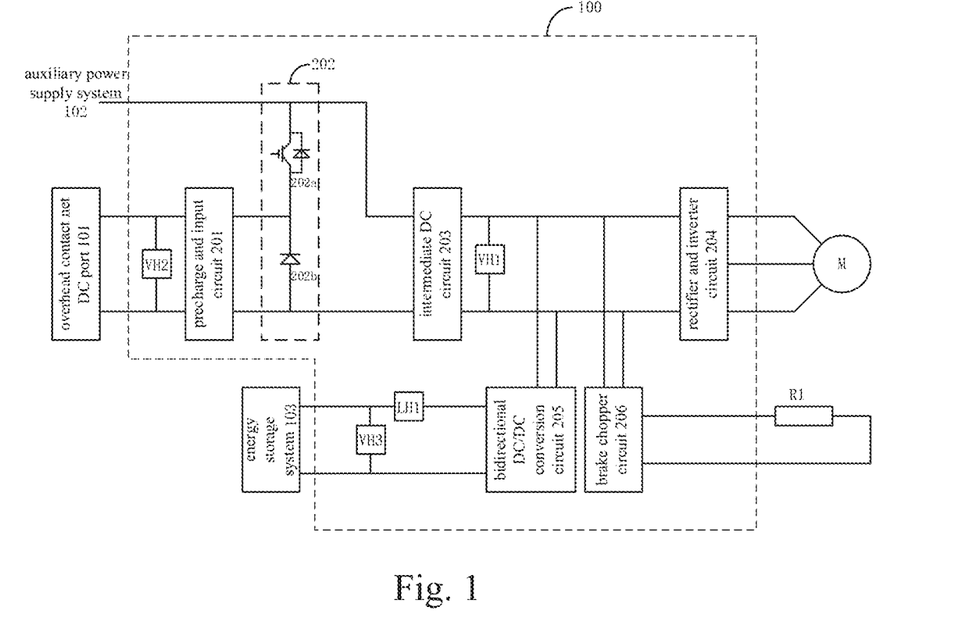
FIG. 1 schematically shows the structure of an electrical brake energy feedback system of an embodiment according to the present invention.

FIG. 1 schematically shows the structure of an electrical brake energy feedback system according to an embodiment.

As shown in FIG. 1, the electrical brake energy feedback system 100 provided by this embodiment preferably includes: a precharge and input circuit 201, a regeneration control circuit 202, an intermediate DC circuit 203, a rectifier and inverter circuit 204, a bidirectional DC/DC conversion circuit 205, and an electrical energy flow control circuit (not shown in FIG. 1). Among others, the precharge and input circuit 201 is preferably an optional circuit, and used to connect with an overhead contact net DC port 101 to receive the DC power transmitted from the overhead contact net DC port 101 or feedback the DC power to the overhead contact net DC port 101. The precharge and input circuit 201 can perform precharge processing and other related processing (such as, filtering or the like) on the received DC power, and transmit the processed DC power to a related circuit connected thereto.

In this embodiment, the regeneration control circuit 202 is connected between the precharge and input circuit 201 and the intermediate DC circuit 203, and at the same time connected to the electrical energy flow control circuit. The regeneration control circuit 202 can, under the control of the electrical energy flow control circuit, turn on or cut off a conductive loop between the precharge and input circuit 201 and the intermediate DC circuit 203.

When the conductive loop between the precharge and input circuit 201 and the intermediate DC circuit 203 is turned on, the DC power provided by the overhead contact net DC port 101 can be transmitted to the intermediate DC circuit 203 through the precharge and input circuit 201 and the regeneration control circuit 202, or the DC power provided by the intermediate DC circuit 203 can be fed back to the overhead contact net DC port 101 through the regeneration control circuit 202 and the precharge and input circuit 201.

However, when the conductive loop between the precharge and input circuit 201 and the intermediate DC circuit 203 is cut off, the DC power provided by the overhead contact net DC port 101 cannot be transmitted to the following circuits of the vehicle, or the DC power generated by the vehicle cannot be fed back to the overhead contact net DC port 101.

As shown in FIG. 1, in this embodiment, the regeneration control circuit 202 preferably includes an IGBT module 202a and a diode 202b. The anode and cathode of the diode 202b are respectively connected to the negative and positive output terminals of the precharge and input circuit 201, that is, the diode 202b is connected in reverse between the negative and positive output terminals of the precharge and input circuit 201. At the same time, the anode of the diode 202b is further connected to the negative terminal of the intermediate DC circuit 203.

The emitter of the IGBT module 202a is connected to the positive output terminal of the precharge and input circuit 201 (i.e., the negative terminal of the diode 202b), the collector thereof is connected to the positive terminal of the intermediate DC circuit, and the gate thereof is connected to the electrical energy flow control circuit. By controlling the on-off state of the IGBT module 202a, the electrical energy flow control circuit can control the regeneration control circuit 202 to turn on or cut off the conductive loop between the precharge and input circuit 201 and the intermediate DC circuit 203.

In this embodiment, when the voltage of the overhead contact net DC port 101 is greater than that of the intermediate DC circuit 203, the regeneration control circuit 202 is equivalent to be in a normally closed state because of the presence of a freewheeling diode in the IGBT module 202a. In this case, the electrical energy provided by the overhead contact net DC port 101 will be transmitted to the intermediate DC circuit 203 through the freewheeling diode. However, when the voltage of the overhead contact net DC port 101 is lower than that of the intermediate DC circuit 203, the voltage between the positive and negative terminals of the freewheeling diode in the IGBT module 202a will be the reverse voltage, and thus the freewheeling diode will be in a cutoff state. At this time, the electrical energy flow control circuit can turn on or cut off the conductive loop between the overhead contact net DC port 101 and the intermediate DC circuit 203 by controlling the on/off state of the IGBT element.

Of course, in other embodiments of the present invention, the regeneration control circuit 202 may also be implemented with other reasonable circuit forms or other controllable switching devices, and the present invention is not limited in this connection.

As shown in FIG. 1, in this embodiment, the intermediate DC circuit 203 is also connected to an auxiliary power supply system 102, which is equivalent to being connected to an output end of the regeneration control circuit 202. In this way, the intermediate DC circuit 203 or the overhead contact net DC port 101 can also provide the auxiliary power supply system 203 with the electrical energy required for operation of the auxiliary load.

The intermediate DC circuit 203 is connected between the regeneration control circuit 202 and the rectifier and inverter circuit 204, and preferably includes a supporting capacitor, or the like. When the vehicle is in a traction mode, the rectifier and inverter circuit 204 can invert the DC power from the intermediate DC circuit 203 into corresponding AC power, and then transmit it to the traction motor M connected thereto, in order to drive the traction motor M in operation. When the vehicle is in a braking condition, the traction motor M will act as a generator to generate AC power, and transmit it to the rectifier and inverter circuit 204 connected thereto. At this time, the rectifier and inverter circuit 204 will rectify the AC power from the traction motor M into corresponding DC power, and transmit it to the intermediate DC circuit 203.

In this embodiment, one end of the bidirectional DC/DC conversion circuit 205 is connected to the intermediate DC circuit 203, and the other end thereof is connected to an energy storage system 103. The bidirectional DC/DC conversion circuit 205 is further connected to the electrical energy flow control circuit. The bidirectional DC/DC conversion circuit 205 can, based on the actual working conditions and under the control of the electrical energy flow control circuit, convert the electrical energy transmitted by the intermediate DC circuit to the energy storage system 103 connected thereto after voltage conversion, so as to charge the energy storage system 103. The bidirectional DC/DC conversion circuit 205 can also, based on the actual working conditions and under the control of the electrical energy flow control circuit, convert the DC power transmitted by the energy storage system 103 to the intermediate DC circuit connected thereto after voltage conversion, thus providing the auxiliary power supply system 102 and/or the traction motor M with electrical energy.

In addition, as shown in FIG. 1, in this embodiment the system may optionally include a brake chopper circuit 206. The brake chopper circuit 206 is connected to the electrical energy flow control circuit, and can, under the control of the electrical energy flow control circuit, turn on or off a conductive loop between the intermediate DC circuit 203 and a brake resistor R1. If the conductive loop between the intermediate DC circuit 203 and the brake resistor R1 is turned on, the electrical energy provided by the intermediate DC circuit 203 will be partially or fully transmitted to the brake resistor R1, and converted by the brake resistor R1 into heat energy for dissipation.

Specifically, in this embodiment, the system further includes a first voltage detection circuit VH1, a second voltage detection circuit VH2, a third voltage detection circuit VH3, and a first current detection circuit LH1. Among others, the first voltage detection circuit VH1 is connected to the intermediate DC circuit 203, for detecting voltages of the positive and negative terminals of the intermediate DC circuit 203, and transmitting a first voltage signal as obtained to the electrical energy flow control circuit connected thereto.

The second voltage detection circuit VH2 is connected to the regeneration control circuit 201 and the electrical energy flow control circuit, for detecting voltages of the positive and negative input terminals of the regeneration control circuit 201 (that is, voltages of the positive and negative terminals of the overhead contact net DC port), and transmitting a second voltage signal as obtained to the electrical energy flow control circuit connected thereto.

The third voltage detection circuit VH3 is connected to the bidirectional DC/DC conversion circuit 205, for detecting a voltage between the positive and negative ports of the bidirectional DC/DC conversion circuit 205 that are adjacent to the energy storage system 103 (that is, voltages of the positive and negative terminals of the energy storage system 103), and transmitting a third voltage signal as obtained to the electrical energy flow control circuit connected thereto. The first current detection circuit is connected in series in a conductive loop between the energy storage system 103 and the bidirectional DC/DC conversion circuit 205, for detecting a current flowing to or from the energy storage system 103, and transmitting a first current signal as obtained to the electrical energy flow control circuit connected thereto.

In this embodiment, the electrical energy flow control circuit preferably determines the operation state of the vehicle, that is, whether the vehicle is running in a zone with the overhead contact net, based on the second voltage signal. Specifically, in this embodiment, if the second voltage signal is greater than zero, it can be determined by the electrical energy flow control circuit that the vehicle is running in a zone with the overhead contact net; otherwise, it can be determined that the vehicle is running in a zone without the overhead contact net.

If the vehicle is running in a zone with the overhead contact net, when the vehicle is in a braking condition, the traction motor M will generate AC power and transmit it to the rectifier and inverter circuit 204 connected thereto. At this time, the rectifier and inverter circuit 204 will serve as a rectifier circuit to rectify the AC power transmitted by the traction motor M into corresponding DC power. At this time, there will be a voltage difference between the positive and negative ports of the rectifier and inverter circuit 204 that are adjacent to the intermediate DC circuit 203 (that is, between the positive and negative terminals of the intermediate DC circuit 203 that are adjacent to the rectifier and inverter circuit 204). The first voltage detection circuit will detect this voltage difference, and transmit the obtained first voltage signal to the electrical energy flow control circuit connected thereto.

After receiving the above first voltage signal, the electrical energy flow control circuit will determine the specific flow direction of the electrical energy provided by the traction motor M according to the first voltage signal. Specifically, in this embodiment, the electrical energy flow control circuit will determine whether the first voltage signal is less than or equal to a first preset voltage threshold.

Among others, if the first voltage signal is less than or equal to the first preset voltage threshold, it means that the electrical energy generated by the traction motor M can be completely consumed by the auxiliary power supply system 102, so that at this time the electrical energy flow control circuit will control the bidirectional DC/DC conversion circuit 205, the regeneration control circuit 202, and the brake chopper circuit 206 are each in a non-working state. In this case, the conductive loop between the intermediate DC circuit 203 and the auxiliary power supply system 102 will be in a turn-on state, while the conductive loop between the energy storage system 103 and the rectifier and inverter circuit 204, that between the intermediate DC circuit 203 and the precharge and input circuit 201, and that between the rectifier and inverter circuit 204 and the brake resistor R1 will be each in a cut-off state. Therefore, the electrical energy generated by the traction motor M will be all transmitted to the auxiliary power supply system 102, for supplying power to the auxiliary power supply system 102.

If the first voltage signal is greater than the first preset voltage threshold, it means that at this time the auxiliary power supply system 102 cannot completely consume the electrical energy generated by the traction motor M. In this embodiment, the electrical energy flow control circuit will further determine whether the first voltage signal is less than or equal to a second preset voltage threshold.

If the first voltage signal is greater than the first preset voltage threshold but less than or equal to the second preset voltage threshold, the electrical energy flow control circuit will control the bidirectional DC/DC conversion circuit 205 to be in an operating state, but the regeneration control circuit 202 and the brake chopper circuit 206 each to be in a non-operating state. In this case the conductive loop between the intermediate DC circuit 203 and the auxiliary power supply system 102 and that between the energy storage system 103 and the rectifier and inverter circuit 204 will be in a turn-on state, while the conductive loop between the intermediate DC circuit 203 and the precharge and input circuit 201 and that between the rectifier and inverter circuit 204 and the brake resistor R1 will be in a cut-off state. Therefore, the bidirectional DC/DC conversion circuit 205 can transmit the electrical energy generated by the traction motor M but not being consumed by the auxiliary power supply system 102 to the energy storage system 103 through a buck chopper, so as to be stored by the energy storage system 103.

If the first voltage signal is greater than the second preset voltage threshold but less than or equal to a third preset voltage threshold, the electrical energy flow control circuit will control the bidirectional DC/DC conversion circuit 205 and the regeneration control circuit 202 each to be in an operating state, but the brake chopper circuit 206 in a non-operating state. In this case, the conductive loop between the intermediate DC circuit 203 and the auxiliary power supply system 102, that between the energy storage system 103 and the rectifier and inverter circuit 204, and that between the intermediate DC circuit 203 and the precharge and input circuit 201 will each be in a turn-on state, while the conductive loop between the rectifier and inverter circuit 204 and the brake resistor R1 will be in a cut-off state. Therefore, the precharge and input circuit 201 can transmit the electrical energy generated by the traction motor M but not being consumed by the auxiliary power supply system 102 and the energy storage system 103 to the overhead contact net DC port 101, so that part of the electrical energy is stored by the energy storage system 103 while part thereof is fed back to the overhead contact net.

Specifically, in this embodiment, the electrical energy flow control circuit preferably determines the energy storage state of the energy storage system 103 (such as, a ratio of charging completion, etc.) according to the third voltage signal and/or the first current signal. Of course, in other embodiments of the present invention, the electrical energy flow control circuit may determine the energy storage state of the energy storage system 103 through other reasonable ways, and the present invention is not limited in this connection.

If the first voltage signal is greater than the third preset voltage threshold, the electrical energy flow control circuit will control the bidirectional DC/DC conversion circuit 205, the regeneration control circuit 202 and the brake chopper circuit 206 each to be in an operating state. In this case, the conductive loop between the intermediate DC circuit 203 and the auxiliary power supply system 102, that between the energy storage system 103 and the rectifier and inverter circuit 204, that between the intermediate DC circuit 203 and the precharge and input circuit 201 and that between the rectifier and inverter circuit 204 and the brake resistor R1 will each be in a turn-on state. Therefore, the electrical energy, which is generated by the traction motor M, but neither be consumed by the auxiliary power supply system 102 and the energy storage system 103 nor be absorbed by the overhead contact net, will be transmitted to the brake chopper circuit 206. And finally, the remaining electrical energy will be converted by the brake resistor R1 into heat energy for dissipation.

If the vehicle is running in a zone without the overhead contact net, when the vehicle is in the braking condition, the traction motor M will similarly generate AC power and transmit it to the rectifier and inverter circuit 204 connected thereto. At this time, the rectifier and inverter circuit 204 will serve as a rectifier circuit to rectify the AC power from the traction motor M into corresponding DC power. At this time, there also exists a voltage difference between the positive and negative ports of the rectifier and inverter circuit 204 that are adjacent to the intermediate DC circuit 203 (that is, between the positive and negative terminals of the intermediate DC circuit 203 that are adjacent to the rectifier and inverter circuit 204). The first voltage detection circuit will detect this voltage difference, and transmit the obtained first voltage signal to the electrical energy flow control circuit connected thereto.

After receiving the above first voltage signal, the electrical energy flow control circuit will determine the specific flow direction of the electrical energy provided by the traction motor M according to the first voltage signal. Specifically, in this embodiment, the electrical energy flow control circuit will determine whether the first voltage signal is less than or equal to the first preset voltage threshold.

In this embodiment, when the first voltage signal is less than or equal to the first preset voltage threshold, or the first voltage signal is greater than the first preset voltage threshold but less than or equal to the second preset voltage threshold, the principle and procedure with which the electrical energy flow control circuit controls individual circuits are the same as those when the first voltage signal is less than or equal to the first preset voltage threshold, or the first voltage signal is greater than the first preset voltage threshold but less than or equal to the second preset voltage threshold if the above-mentioned vehicle is running in a zone with the overhead contact net. Therefore, the details of this part will not be repeated here.

If the first voltage signal is greater than the second preset voltage threshold, since the vehicle is running in a zone without the overhead contact net, the electrical energy, which is generated by the traction motor M but cannot be consumed by the auxiliary power supply system 102 and the energy storage system 103 cannot be fed back to the overhead contact net for further consumption. Therefore, in this embodiment, the electrical energy flow control circuit will control the bidirectional DC/DC conversion circuit 205 and the brake chopper circuit 206 each to be in the working state. In this way, the conductive loop between the intermediate DC circuit 203 and the auxiliary power supply system 102, that between the energy storage system 103 and the rectifier and inverter circuit 204, and that between the rectifier and inverter circuit 204 and the brake resistor R1 will each be in the turn-on state. Accordingly, the electrical energy, which is generated by the traction motor M but cannot be consumed by the auxiliary power supply system 102 and the energy storage system 103 will be transmitted to the brake chopper circuit 206. And finally, the remaining electrical energy will be converted by the brake resistor R1 into heat energy for further consumption.

It should be noted that in different embodiments of the present invention, the first preset voltage threshold, the second preset voltage threshold, and the third preset voltage threshold may be set as different reasonable values according to actual operating conditions. In addition, with respect to two operating conditions, i.e., with or without the overhead contact net, the first preset voltage threshold, the second preset voltage threshold and the third preset voltage threshold can also be set to different reasonable values according to actual needs. The invention is not limited in this connection.

Figure 2:
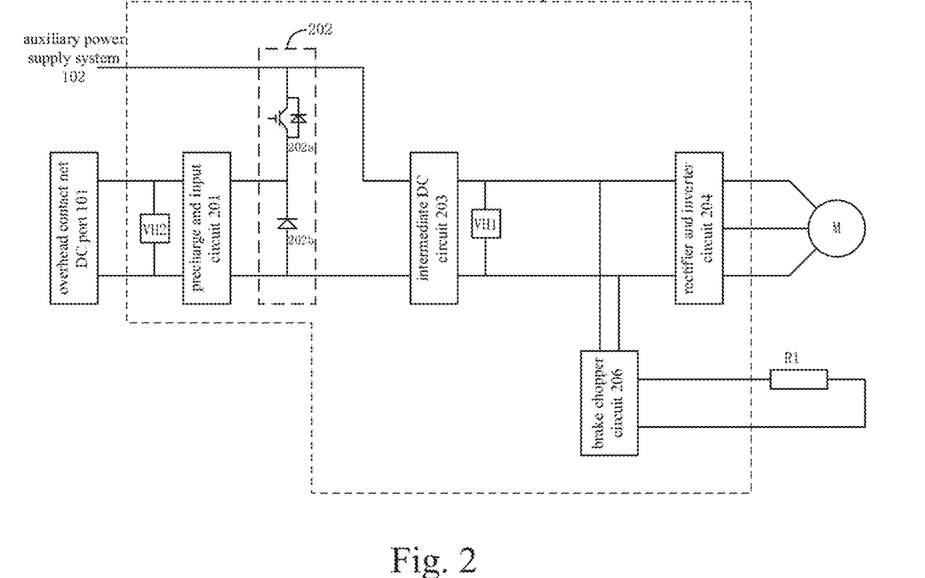
FIG. 2 schematically shows the structure of an electrical brake energy feedback system of another embodiment according to the present invention.
Figure 3:
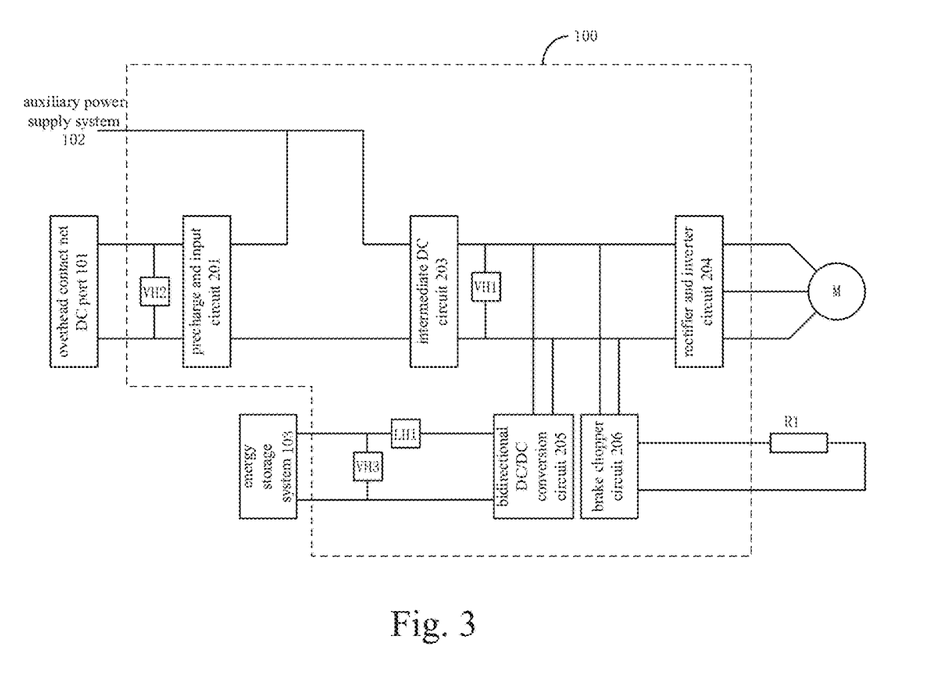
FIG. 3 schematically shows the structure of an electrical brake energy feedback system of a further embodiment according to the present invention.

At the same time, it should be noted that in other embodiments of the present invention, as shown in FIGS. 2 and 3, the above-mentioned electric-braking energy feedback system may include only one of the regeneration control circuit and the bidirectional DC/DC conversion circuit, and the invention is not limited in this connection. For example, in an embodiment of the present invention as shown in FIG. 2, the electrical braking energy feedback system may be configured to include no bidirectional DC/DC conversion circuit and related energy storage system. In this case, when the vehicle is in the braking condition, if the first voltage signal is greater than the first preset voltage threshold but less than or equal to the second preset voltage threshold, the electrical energy flow control circuit is configured to control the regeneration control circuit to transmit the electrical energy, which is provided by the intermediate DC circuit but cannot be consumed by the auxiliary power supply system, to the overhead contact net DC port, so that the electrical energy can be fed back to the overhead contact net.

In addition, in other embodiments of the present invention, the bidirectional DC/DC conversion circuit 205 and/or the regeneration control circuit 202 can be optional according to actual needs.

It can be seen from the foregoing that the electrical braking energy feedback system provided by the embodiment can control the flow of the electrical energy generated by the traction motor in different ways based on the zone where the vehicle is located, so that the electrical braking energy can be recovered to the greatest extent when the vehicle is running in different zones, and the electrical braking energy consumed by the brake resistor is as little as possible. Accordingly, the vehicle and the entire transportation system can be more energy-saving and environmentally friendly.

It should be understood that the disclosed embodiments of the present invention are not limited to the specific structures or processing steps disclosed herein, but should extend to equivalent replacements of these features as understood by those of ordinary skill in the relevant art. It should also be understood that the terminologies used herein are for the purpose of describing particular embodiments only, but not for restricting the present invention.

Expressions such as "one embodiment" or "an embodiment" in the description means that the particular features, structures, or characteristics described in connection with the embodiment are included in at least one embodiment of the present invention. Therefore, the expressions "one embodiment" or "an embodiment" in various places throughout the description do not necessarily all refer to the same embodiment.

Although the above embodiments are used to illustrate the principles of the present invention in one or more applications, it is obvious to those skilled in the art that without departing from the principles and ideas of the present invention, various modifications can be made on format, use, and implementation of these embodiments with no creative effort. Therefore, the scope of the present invention is defined by the appended claims.

The invention claimed is:

1. An electrical brake energy feedback system, comprising:
a rectifier and inverter circuit, which is connected with a traction motor, and configured to, under a traction condition, invert DC power received into corresponding AC power to drive the traction motor to run, and, under a braking condition, rectify AC power generated by the traction motor into corresponding DC power;
an intermediate DC circuit, which is connected to the rectifier and inverter circuit, and also connected to an auxiliary power supply system in order to transmit electrical energy thereto;
a first voltage detection circuit, which is connected to the intermediate DC circuit, and configured to detect voltages of positive and negative terminals of the intermediate DC circuit to obtain a first voltage signal;
a bidirectional DC/DC conversion circuit and/or a regeneration control circuit, wherein the bidirectional DC/DC conversion circuit is connected to the intermediate DC circuit, and configured to, according to an actual operating condition, transmit electrical energy from the intermediate DC circuit, after performing voltage conversion, to a energy storage system connected thereto, or transmit electrical energy from the energy storage system, after performing voltage conversion, to the intermediate DC circuit, and the regeneration control circuit is connected to the intermediate DC circuit and an overhead contact net DC port, and configured to turn on or cut off a conductive loop between the intermediate DC circuit and the overhead contact net DC port; and
an electrical energy flow control circuit, which is connected to the first voltage detection circuit and the bidirectional DC/DC conversion circuit and/or the regeneration control circuit, for controlling operating states of the bidirectional DC/DC conversion circuit and/or the regeneration control circuit according to the first voltage signal.

2. The system according to claim 1, wherein the electrical energy flow control circuit is configured to, when a vehicle is in the braking condition, determine whether the first voltage signal is less than or equal to a first preset voltage threshold, and if yes, control the bidirectional DC/DC conversion circuit and/or the regeneration control circuit to be in a non-operating state, so that the intermediate DC circuit transmits all of electrical energy received to the auxiliary power supply system.

3. The system according to claim 2, wherein when the vehicle is in the braking condition, if the first voltage signal is greater than the first preset voltage threshold but less than or equal to a second preset voltage threshold, the electrical energy flow control circuit is configured to control the bidirectional DC/DC conversion circuit to transmit the electrical energy that is provided by the intermediate DC circuit but cannot be consumed by the auxiliary power supply system, after performing voltage conversion, to the energy storage system, in order to charge the energy storage system.

4. The system according to claim 2, wherein when the vehicle is in the braking condition, if the first voltage signal is greater than the first preset voltage threshold but less than or equal to a second preset voltage threshold, the electrical energy flow control circuit is configured to control the regeneration control circuit to transmit the electrical energy that that is provided by the intermediate DC circuit but cannot be consumed by the auxiliary power supply system to the overhead contact net DC port.

5. The system according to claim 2, wherein the system further comprises:
a third voltage detection circuit, which is connected to the bidirectional DC/DC conversion circuit and the electrical energy flow control circuit, and configured to detect a voltage between ports of the bidirectional DC/DC conversion circuit adjacent to the energy storage system to obtain a third voltage signal, and transmit the third voltage signal to the electrical energy flow control circuit; and
the electrical energy flow control circuit is configured to determine a charge state of the energy storage system according to the third voltage signal.

6. The system according to claim 3, wherein the system further comprises:
a third voltage detection circuit, which is connected to the bidirectional DC/DC conversion circuit and the electrical energy flow control circuit, and configured to detect a voltage between ports of the bidirectional DC/DC conversion circuit adjacent to the energy storage system to obtain a third voltage signal, and transmit the third voltage signal to the electrical energy flow control circuit; and
the electrical energy flow control circuit is configured to determine a charge state of the energy storage system according to the third voltage signal.

7. The system according to claim 1, wherein the system further comprises:
a third voltage detection circuit, which is connected to the bidirectional DC/DC conversion circuit and the electrical energy flow control circuit, and configured to detect a voltage between ports of the bidirectional DC/DC conversion circuit adjacent to the energy storage system to obtain a third voltage signal, and transmit the third voltage signal to the electrical energy flow control circuit; and
the electrical energy flow control circuit is configured to determine a charge state of the energy storage system according to the third voltage signal.

8. The system according to claim 7, wherein the system further comprises:
a second voltage detection circuit, which is connected to the regeneration control circuit and the electrical energy flow control circuit, and configured to detect voltages of positive and negative terminals of the overhead contact net DC port to obtain a second voltage signal, and transmit the second voltage signal to the electrical energy flow control circuit.

9. The system according to claim 8, wherein the electrical energy flow control circuit is configured to determine whether the second voltage signal is greater than zero, and if so, then further determine whether the first voltage signal is greater than a second preset voltage threshold, and if so, the electrical energy flow control circuit is further configured to control the regeneration control circuit to turn on the conductive loop between the intermediate DC circuit and the overhead contact net DC port, so that the regeneration control circuit can transmit the electrical energy that is provided by the intermediate DC circuit but cannot be consumed by the auxiliary power supply system and the energy storage system to the overhead contact net DC port.

10. The system according to claim 9, wherein the system further comprises:
a brake chopper circuit, which is connected to the electrical energy flow control circuit, and configured to, under the control of the electrical energy flow control circuit, turn on or cut off a conductive loop between the intermediate DC circuit and a brake resistor.

11. The system according to claim 10, wherein if the second voltage signal is not greater than zero but the first voltage signal is greater than the second preset voltage threshold, the electrical energy flow control circuit is configured to control the brake chopper circuit to turn on the conductive loop between the intermediate DC circuit and the brake resistor, so that the brake resistor can consume the electrical energy that is provided by the intermediate DC circuit but cannot be consumed by the auxiliary power supply system and the energy storage system.

12. The system according to claim 10, wherein if the second voltage signal is greater than zero, the electrical energy flow control circuit is configured to determine whether the first voltage signal is greater than a second preset voltage but less than or equal to a third preset voltage threshold, and if yes, it is further configured to control the regeneration control circuit to turn on the conductive loop between the intermediate DC circuit and the overhead contact net DC port, so that the regeneration control circuit can transmit the electrical energy that is provided by the intermediate DC circuit but cannot be consumed by the auxiliary power supply system and the energy storage system to the overhead contact net DC port.

13. The system according to claim 11, wherein if the second voltage signal is greater than zero, the electrical energy flow control circuit is configured to determine whether the first voltage signal is greater than a second preset voltage but less than or equal to a third preset voltage threshold, and if yes, it is further configured to control the regeneration control circuit to turn on the conductive loop between the intermediate DC circuit and the overhead contact net DC port, so that the regeneration control circuit can transmit the electrical energy that is provided by the intermediate DC circuit but cannot be consumed by the auxiliary power supply system and the energy storage system to the overhead contact net DC port.

14. The system according to claim 12, wherein if the second voltage signal is greater than zero and the first voltage signal is greater than the third preset voltage threshold, the electrical energy flow control circuit is configured to control the regeneration control circuit to turn on the conductive loop between the intermediate DC circuit and the overhead contact net DC port, and control the brake chopper circuit to turn on the conductive loop between the intermediate DC circuit and the brake resistor, so that the brake resistor can consume the electrical energy that is provided by the intermediate DC circuit but neither be consumed by the auxiliary power supply system and the energy storage system and nor be absorbed by the overhead contact net DC port.

* * * * *